US009865876B2

(12) United States Patent
Mine et al.

(10) Patent No.: US 9,865,876 B2
(45) Date of Patent: Jan. 9, 2018

(54) ELECTRODE MATERIAL, ELECTRODE, AND LITHIUM ION BATTERY

(71) Applicant: SUMITOMO OSAKA CEMENT CO., LTD., Chiyoda-ku, Tokyo (JP)

(72) Inventors: Hiroyuki Mine, Tokyo (JP); Takao Kitagawa, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 0 days.

(21) Appl. No.: 14/666,935

(22) Filed: Mar. 24, 2015

(65) Prior Publication Data

US 2015/0194675 A1 Jul. 9, 2015

Related U.S. Application Data

(63) Continuation of application No. PCT/JP2014/072519, filed on Aug. 28, 2014.

(30) Foreign Application Priority Data

Oct. 30, 2013 (JP) ................................ 2013-225472

(51) Int. Cl.
| | |
|---|---|
| *H01M 4/131* | (2010.01) |
| *H01M 4/505* | (2010.01) |
| *H01M 4/525* | (2010.01) |
| *H01M 4/583* | (2010.01) |
| *H01M 10/0525* | (2010.01) |
| *H01M 4/58* | (2010.01) |
| *H01M 4/36* | (2006.01) |
| *H01M 4/485* | (2010.01) |
| *H01M 4/587* | (2010.01) |
| *H01M 4/04* | (2006.01) |
| *H01M 4/02* | (2006.01) |
| *H01M 4/1397* | (2010.01) |
| *H01M 4/62* | (2006.01) |

(52) U.S. Cl.
CPC ......... *H01M 4/5825* (2013.01); *H01M 4/366* (2013.01); *H01M 4/485* (2013.01); *H01M 4/505* (2013.01); *H01M 4/525* (2013.01); *H01M 4/587* (2013.01); *H01M 10/0525* (2013.01); *H01M 4/0471* (2013.01); *H01M 4/1397* (2013.01); *H01M 4/625* (2013.01); *H01M 2004/028* (2013.01); *Y02T 10/7011* (2013.01)

(58) Field of Classification Search
CPC ....... H01M 4/13–4/133; H01M 4/139–4/1393; H01M 4/36–4/366; H01M 4/48–4/525; H01M 4/58–4/587; H01M 4/62; H01M 4/624–4/625; H01M 4/628; H01M 10/05–10/0525

See application file for complete search history.

(56) References Cited

U.S. PATENT DOCUMENTS

| | | | | |
|---|---|---|---|---|
| 5,789,114 | A * | 8/1998 | Adachi et al. | 429/232 |
| 6,855,273 | B2 * | 2/2005 | Ravet et al. | 252/506 |
| 2006/0147365 | A1 * | 7/2006 | Okada et al. | 423/306 |
| 2006/0154147 | A1 * | 7/2006 | Kurihara | H01M 4/587 429/231.8 |
| 2010/0261063 | A1 * | 10/2010 | Kitagawa et al. | 429/232 |
| 2010/0297496 | A1 * | 11/2010 | Ravet et al. | 429/207 |
| 2011/0027651 | A1 * | 2/2011 | Sun | C01B 15/00 429/220 |
| 2012/0258363 | A1 * | 10/2012 | Kawasaki et al. | 429/221 |
| 2013/0040203 | A1 * | 2/2013 | Yoon | H01M 4/1393 429/231.8 |

FOREIGN PATENT DOCUMENTS

| | | |
|---|---|---|
| EP | 2503626 A1 | 9/2012 |
| EP | 2760069 A1 | 7/2014 |
| JP | A-2001-015111 | 1/2001 |
| JP | 2004-063386 A | 2/2004 |
| JP | 2009-187963 A | 8/2009 |
| JP | A-2011-108522 | 6/2011 |
| JP | A-2012-094408 | 5/2012 |
| JP | A-2013-506266 | 2/2013 |
| WO | WO 2011/062019 A1 | 5/2011 |
| WO | 2012/039477 A1 | 3/2012 |
| WO | WO 2012/086976 A2 | 6/2012 |
| WO | WO 2013/042538 A1 | 3/2013 |
| WO | WO 2013/146168 A1 | 10/2013 |

OTHER PUBLICATIONS

Arizona Instrument LLC. (2013). Computrac VAPOR PRO Moisture Analyzer User Manual Part No. 700-0049. Chandler, AZ. Retrieved from http://www.azic.com/wp-content/uploads/2014/12/700-0049-Computrac-Vapor-Pro%C2%AE-Users-Manual.pdf.*
European Search Report for European Patent Application No. 14845028.1 (dated Aug. 18, 2015).
International Search Report for International Patent Application No. PCT/JP2014/072519 (dated Nov. 11, 2014).
"Story of Lithium Ion Secondary Battery"; Shokabo, First Edition, May 20, 1997, p. 68 (line 2 to last line), 3 pages.
Office Action for Japanese Patent Application No. 2013-225472 (dated May 10, 2016).

* cited by examiner

*Primary Examiner* — Jonathan Crepeau
*Assistant Examiner* — Jacob Buchanan
(74) *Attorney, Agent, or Firm* — Merchant & Gould P.C.

(57) ABSTRACT

An electrode material, an electrode, and a lithium ion battery in which it is possible to improve not only the amount of gas generated in the battery during charge and discharge but also the deterioration of battery components without reducing the charge and discharge capacity are provided. The electrode material is an electrode material including carbonaceous electrode active material complex particles which include a carbonaceous material on surfaces of electrode active material particles, in which an oxygen content rate in the carbonaceous material is 5.0% by mass or less, and a coating ratio of the carbonaceous material on the surfaces of the carbonaceous electrode active material complex particles is 60% or more.

14 Claims, No Drawings

ELECTRODE MATERIAL, ELECTRODE, AND LITHIUM ION BATTERY

CROSS-REFERENCE TO RELATED APPLICATION

This is a Continuation Application of International Application No. PCT/JP2014/072519, filed Aug. 28, 2014, which claims priority to Japanese Patent Application No. 2013-225472 filed on Oct. 30, 2013. The contents of the aforementioned applications are incorporated herein by reference.

TECHNICAL FIELD

The present invention relates to an electrode material, an electrode, and a lithium ion battery, and particularly to an electrode material preferably available for use as cathode materials for batteries, furthermore, cathode materials for lithium ion batteries, an electrode including the electrode material, and a lithium ion battery including a cathode made of the electrode.

Priority is claimed on Japanese Patent Application No. 2013-225472, filed on Oct. 30, 2013, the content of which is incorporated herein by reference.

BACKGROUND ART

In recent years, as a battery anticipated to have small size, light weight, and high capacity, a non-aqueous electrolytic solution-based secondary battery such as a lithium ion battery has been proposed and put into practical use.

The lithium ion battery is constituted of a cathode and an anode which allow the reversible insertion and removal of lithium ions, and a non-aqueous electrolyte.

Regarding an anode material for lithium ion batteries, as an anode active material, generally, a lithium-containing metal oxide allowing the reversible insertion and removal of lithium ions such as a carbon-based material or lithium titanate ($Li_4Ti_5O_{12}$) is used.

On the other hand, regarding a cathode material for lithium ion batteries, as a cathode active material, generally, a lithium-containing metal oxide allowing the reversible insertion and removal of lithium ions such as lithium iron phosphate ($LiFePO_4$) or an electrode material mixture is used. In addition, the cathode in the lithium ion battery is formed by applying the electrode material mixture to the surface of a metal foil called a current collector.

Compared with secondary batteries of the related art such as lead batteries, nickel-cadmium batteries, and nickel-hydrogen batteries, lithium ion batteries have a lighter weight, a smaller size, and higher energy, and thus are used not only as small-size power supplies but also as large-size stationary emergency power supplies in portable electronic devices such as mobile phones and notebook personal computers.

In addition, recently, studies have been underway regarding the use of lithium ion batteries as high-output power supplies for plug-in hybrid vehicles, hybrid vehicles, and electric power tools, and batteries used as the high-output power supplies are required to have high-speed charge and discharge characteristics.

However, electrode materials including an electrode active material, for example, a lithium phosphate compound allowing the reversible insertion and removal of lithium ions have a problem of low electron conductivity. Therefore, as electrode materials having increased electron conductivity, an electrode material in which particle surfaces of an electrode active material are uniformly coated with a chemically-deposited carbonaceous material, and the current density of the electrode active material is improved (Japanese Laid-open Patent Publication No. 2001-15111), an electrode material including a carbon black complex obtained by conjugating fibrous carbon and carbon black and olivine-type lithium iron phosphate (Japanese Laid-open Patent Publication No. 2011-108522), and the like have been proposed.

DISCLOSURE OF THE INVENTION

Problems to be Solved by the Invention

In order to use an electrode active material including a lithium phosphate compound as a battery material for lithium ion batteries used as high-output power supplies, it is necessary to increase the electron conductivity of a carbon material on the surface of the electrode active material.

However, the carbon material has a number of oxygen functional groups, and thus there has been a problem in that the oxygen functional groups are oxidized during charge and discharge, gas is generated, the gas increases the internal pressure of the battery, and in some cases, the battery may break.

Since the oxygen functional group is hydrophilic, the presence of the oxygen functional group increases adsorbed moisture, and thus there is a concern that the moisture may cause the deterioration of battery components and the deterioration or breakage of the battery through the generation of gas caused by the decomposition of water.

Thus far, there have been a variety of studies conducted to reduce the oxygen functional groups, and for example, there has been proposed an electrode material in which, in order to reduce the amount of the oxygen functional group, the surface area of carbon is reduced by increasing the particle diameters of electrode active material particles. However, in this electrode material, the migration speed of lithium ions is slow, the migration distance of the lithium ions in the electrode active material increases, and thus there has been a concern that the total internal resistance of the battery may increases, and particularly, the voltage may significantly drop when high-speed charge and discharge is carried out.

The present invention has been made to solve the above problem, and an purpose of some aspects of the present invention is to provide an electrode material, an electrode, and a lithium ion battery in which it is possible to improve not only the amount of gas generated in the battery during charge and discharge but also the deterioration of battery components without reducing the charge and discharge capacity.

Means of Solving the Problems

As a result of intensive studies to solve the above-described problem, the present inventors found that, for carbonaceous electrode active material complex particles including a carbonaceous material on the surfaces of electrode active material particles, when the oxygen content rate in the carbonaceous material is set to 5.0% by mass or less, and furthermore, the coating ratio of the carbonaceous material on the surfaces of the carbonaceous electrode active material complex particles is set to 60% or more, it is possible to control the amount of oxygen functional groups in the carbonaceous material present on the surfaces of the electrode active material particles having a great moisture adsorption amount, and thus it is possible to improve not only the amount of gas generated in the battery during charge and discharge but also the deterioration of battery components without reducing the charge and discharge capacity, and completed the present invention.

That is, an electrode material of the present invention is an electrode material containing a carbonaceous electrode active material complex particles which includes a carbonaceous material on surfaces of electrode active material particles, in which an oxygen content rate in the carbonaceous material is 5.0% by mass or less, and a coating ratio of the carbonaceous material on the surfaces of the carbonaceous electrode active material complex particles is 60% or more.

A water content rate of the carbonaceous electrode active material complex particles is preferably 5% by mass or less.

A content rate of carbon in the carbonaceous electrode active material complex particles is preferably in a range of 0.3% by mass to 8.0% by mass.

The electrode active material particles preferably include one selected from a group consisting of lithium cobaltate, lithium nickelate, lithium manganate, lithium titanate, and $Li_xA_yD_zPO_4$ (here, A represents one or more selected from a group consisting of Co, Mn, Ni, Fe, Cu, and Cr, D represents one or more selected from a group consisting of Mg, Ca, S, Sr, Ba, Ti, Zn, B, Al, Ga, In, Si, Ge, Sc, Y, and rare earth elements, $0<x<2$, $0<y<1.5$, and $0 \leq z<1.5$) as a main component.

An electrode of the present invention includes the electrode material of the present invention.

A lithium ion battery of the present invention includes a cathode made of the electrode of the present invention.

According to the electrode material of the present invention, since the oxygen content rate in the carbonaceous material on the carbonaceous electrode active material complex particles is set to 5.0% by mass or less, and the coating ratio of the carbonaceous material on the surfaces of the carbonaceous electrode active material complex particles is set to 60% or more, it is possible to suppress not only the amount of gas generated in the battery during charge and discharge but also the deterioration of battery components without reducing the charge and discharge capacity. Therefore, it is possible to provide an electrode material having excellent charge and discharge characteristics and long-term reliability.

According to the electrode of the present invention, since the electrode material of the present invention is included, it is possible to suppress not only the amount of gas generated in the battery during charge and discharge but also the deterioration of battery components without reducing the charge and discharge capacity. Therefore, it is possible to provide an electrode having excellent charge and discharge characteristics and long-term reliability.

According to the lithium ion battery of the present invention, since the cathode made of the electrode of the present invention is included, it is possible to suppress not only the amount of gas generated in the battery during charge and discharge but also the deterioration of battery components without reducing the charge and discharge capacity. Therefore, it is possible to provide a lithium ion battery having excellent charge and discharge characteristics and long-term reliability.

BEST MODE FOR CARRYING OUT THE INVENTION

Embodiments for carrying out the electrode material, electrode, and lithium ion battery of the present invention will be described.

The embodiments are specific descriptions for better understanding of the purpose of the present invention, and unless particularly otherwise described, the present invention is not limited thereto.

Electrode Material

An electrode material of the present embodiment is an electrode material containing carbonaceous electrode active material complex particles which includes a carbonaceous material on surfaces of electrode active material particles, in which an oxygen content rate in the carbonaceous material is 5.0% by mass or less, and a coating ratio of the carbonaceous material on the surfaces of the carbonaceous electrode active material complex particles is 60% or more.

Here, the carbonaceous material refers to a simple substance of carbon or a carbon material including carbon as a main component.

In addition, "including a carbonaceous material on surfaces of electrode active material particles" refers to, in addition to a state in which the surfaces of the electrode active material particles are covered with a coat (carbonaceous film) made of a carbonaceous material, either or both states of a state in which a plurality of particles made of a simple substance of carbon or particles made of a carbon material including carbon as a main component are attached or bonded to the surface of the electrode active material particles and a state in which a plurality of agglomerates formed by agglomerating a plurality of particles made of a simple substance of carbon or particles made of a carbon material including carbon as a main component are attached or bonded to the surface of the electrode active material particles.

Examples of this state also include a state in which any one or more of particles made of a simple substance of carbon, particles made of a carbon material including carbon as a main component, and agglomerates formed by agglomerating a plurality of the particles.

The components of the electrode active material particles are preferably, as a main component, one selected from a group consisting of lithium cobaltate, lithium nickelate, lithium manganate, lithium titanate, and $Li_xA_yD_zPO_4$ (here, A represents one or more selected from a group consisting of Co, Mn, Ni, Fe, Cu, and Cr, D represents one or more selected from a group consisting of Mg, Ca, S, Sr, Ba, Ti, Zn, B, Al, Ga, In, Si, Ge, Sc, Y, and rare earth elements, $0<x<2$, $0<y<1.5$, and $0 \leq z<1.5$).

Here, A is preferably Co, Mn, Ni, or Fe, and D is preferably Mg, Ca, Sr, Ba, Ti, Zn, or Al in terms of a high discharge potential, an abundant resource amount, safety, and the like.

Here, the rare earth elements refer to the 15 elements of La, Ce, Pr, Nd, Pm, Sm, Eu, Gd, Tb, Dy, Ho, Er, Tm, Yb, and Lu which belong to the lanthanum series.

The coating ratio of the carbonaceous material (material) on the surfaces of the electrode active material particles can be measured using a transmission electron microscope (TEM), an energy-dispersive X-ray spectroscope (EDX), or the like.

To allow a reaction relating to the insertion and removal of lithium ions to uniformly occur on all the surfaces of the electrode active material particles when the electrode active material particles are used as an electrode material for lithium ion batteries, 60% or more, and preferably, 80% or more of the surfaces of the electrode active material particles are preferably covered with the carbonaceous material.

The reason for setting the coating ratio of the carbonaceous material on the surfaces of the electrode active material particles to 60% or more is that, when the coating ratio is less than 60%, the surfaces of the electrode active material particles are exposed, moisture is likely to be adsorbed into the surfaces, and battery components are deteriorated due to hydrofluoric acid being generated by the adsorbed moisture, in addition, gas is generated by the decomposition of water through charge and discharge, the internal pressure in the battery increases, and there is a concern that the battery may break, which is not preferable.

The amount of oxygen in the carbonaceous material is dependent on the amount of an oxygen-containing functional group including any one of a hydroxyl group (—OH), a carbonyl group (>C=O), a carboxyl group (—COOH), an ether bond, and an ester bond at the terminal or near the terminal.

Therefore, the oxygen content rate in the carbonaceous material is preferably 5.0% by mass or less, and more preferably 3.0% by mass or less.

The reason for setting the oxygen content rate in the carbonaceous material to 5.0% by mass or less is that, when the oxygen content rate in the carbonaceous material exceeds 5.0% by mass, the internal pressure in the lithium ion battery is increased by gas being generated by the oxidization of the oxygen-containing functional group present in the carbonaceous material during charge, and consequently, there is a concern that the lithium ion battery may break, which is not preferable.

In addition, when the oxygen content rate in the carbonaceous material exceeds 5.0% by mass, the amount of moisture adsorbed into the oxygen-containing functional group in the carbonaceous material is increased, $LiPF_6$ which is an electrolyte is decomposed by moisture remaining when the lithium ion battery is produced, and there is a concern that hydrofluoric acid being generated by the decomposition may deteriorate the battery components, which is not preferable.

The specific surface area of the carbonaceous electrode active material complex particles is preferably in a range of 1 $m^2$/g to 80 $m^2$/g, and more preferably in a range of 4 $m^2$/g to 50 $m^2$/g.

The reason for setting the specific surface area of the carbonaceous electrode active material complex particles in a range of 1 $m^2$/g to 80 $m^2$/g is that, when the specific surface area is less than 1 $m^2$/g, the migration of lithium ions or electrons in the carbonaceous electrode active material complex particles takes time, consequently, the internal resistance increases, and the output characteristics deteriorate, which is not preferable. On the other hand, when the specific surface area exceeds 80 $m^2$/g, the increase in the specific surface area of the carbonaceous electrode active material complex particles increases the necessary mass of carbon, and consequently, the charge and discharge capacity is reduced, which is not preferable.

Meanwhile, the "internal resistance" mentioned herein refers to the sum of, mainly, electron resistance and lithium ion migration resistance, the electron resistance is proportional to, the amount of carbon, and the density and crystallinity of carbon, and the lithium ion migration resistance is inversely proportional to the amount, density, and crystallinity of carbon.

As a method for assessing the internal resistance, for example, a current rest method or the like is used. In the current rest method, the internal resistance is measured as the sum of interconnection resistance, contact resistance, charge migration resistance, lithium ion migration resistance, lithium reaction resistances in the cathodes and anodes, interelectrode resistance determined by the distance between the cathodes and anodes, the resistance relating to the solvation and desolvation of the lithium ions, and the solid electrolyte interface (SEI) migration resistance of the lithium ions.

The water content rate of the carbonaceous electrode active material complex particles is preferably 5% by mass or less, and more preferably 2.5% by mass or less.

The reason for setting the water content rate of the carbonaceous electrode active material complex particles to 5% by mass or less is that, when the water content rate exceeds 5% by mass, in the production of a lithium ion battery using the carbonaceous electrode active material complex particles, $LiPF_6$ which is an electrolyte is decomposed by remaining moisture, and consequently, hydrofluoric acid being generated by the decomposition may deteriorate the battery components, which is not preferable.

The content rate of carbon in the carbonaceous electrode active material complex particles is preferably in a range of 0.3% by mass to 8.0% by mass, and more preferably in a range of 0.5% by mass to 5.0% by mass.

The reason for setting the content rate of carbon in the carbonaceous electrode active material complex particles in a range of 0.3% by mass to 8.0% by mass is that, when the content rate is less than 0.3% by mass, the discharge capacity at a high-speed charge and discharge rate becomes low in a case in which a battery is formed, and it becomes difficult to realize sufficient charge and discharge rate performance, which is not preferable. When the content rate exceeds 8.0% by mass, the migration distance of the lithium ions in carbon increases, during the diffusion of the lithium ions in the carbonaceous film, the diffusion rate of the lithium ions is slow, the migration distance in the carbonaceous film becomes long, and consequently, the voltage drop at a high-speed charge and discharge rate needs to be addressed.

Method for Manufacturing the Electrode Material

A method for manufacturing the electrode material of the present embodiment is a method in which a slurry, which includes an electrode active material or a precursor thereof, an organic compound, and water, and has a ratio (D90/D10) of the particle diameter (D90) when the accumulated volume percentage is 90% in the particle size distribution of the electrode active material or the precursor thereof to the particle diameter (D10) when the accumulated volume percentage is 10% in a range of 5 to 30, is dried, and then the obtained dried substance is fired at 500° C. to 1000° C. in a non-oxidative atmosphere.

The obtained fired substance is preferably secondarily fired in a reducing atmosphere at 500° C. to 1000° C.

Similar to the description of the electrode material, the electrode active material preferably includes, as a main component, one selected from a group consisting of lithium cobaltate, lithium nickelate, lithium manganate, lithium titanate, and $Li_xA_yD_zPO_4$ (here, A represents one or more selected from a group consisting of Co, Mn, Ni, Fe, Cu, and Cr, D represents one or more selected from a group consisting of Mg, Ca, S, Sr, Ba, Ti, Zn, B, Al, Ga, In, Si, Ge, Sc, Y, and rare earth elements, 0<x<2, 0<y<1.5, and 0≤z<1.5).

Here, A is preferably Co, Mn, Ni, or Fe, and D is preferably Mg, Ca, Sr, Ba, Ti, Zn, or Al in terms of a high discharge potential, an abundant resource amount, safety, and the like.

Here, the rare earth elements refer to the 15 elements of La, Ce, Pr, Nd, Pm, Sm, Eu, Gd, Tb, Dy, Ho, Er, Tm, Yb, and Lu which belong to the lanthanum series.

As the compound represented by $Li_xA_yD_zPO_4$ ($Li_xA_yD_zPO_4$ powder), it is possible to use a compound manufactured using a method of the related art such as a solid phase method, a liquid phase method, or a gas phase method.

As the compound ($Li_xA_yD_zPO_4$ powder), a compound ($Li_xA_yD_zPO_4$ particles) obtained by, for example, hydrothermally synthesizing a slurry-form compound obtained by mixing a Li source selected from a group consisting of lithium salts such as lithium acetate ($LiCH_3COO$) and lithium chloride (LiCl) and lithium hydroxide (LiOH), a divalent iron salt such as iron (II) chloride ($FeCl_2$), iron (II) acetate ($Fe(CH_3COO)_2$), or iron (II) sulfate ($FeSO_4$), a phosphoric acid compound such as phosphoric acid ($H_3PO_4$), ammonium dihydrogen phosphate ($NH_4H_2PO_4$), or diammonium hydrogen phosphate ($(NH_4)_2HPO_4$), and water using a pressure-resistant airtight container, washing the obtained sediment using water so as to generate a cake-form precursor substance, and firing the cake-form precursor substance can be preferably used.

The $Li_xA_yD_zPO_4$ powder may be crystalline particles, amorphous particles, or mixed crystal particles in which crystalline particles and amorphous particles coexist. The $Li_xA_yD_zPO_4$ powder may be amorphous particles since, when thermally treated in a non-oxidative atmosphere at 500° C. to 1000° C., the amorphous $Li_xA_yD_zPO_4$ powder crystallizes.

In a case in which electrode active material particles are used as the electrode active material or the precursor thereof, to improve the coating efficiency of the carbonaceous material on the surfaces of the electrode active material particles, it is preferable to modify the surfaces of the electrode active material particles using a surface modifier.

The reason for the surfaces of the electrode active material particles to be preferably modified is that, when the surfaces are modified, it is possible to prevent an organic compound from separating from the surfaces of the electrode active material particles when a slurry obtained by mixing the electrode active material particles, the organic compound, and water is sprayed and dried in the atmosphere in the subsequent steps.

The surface modifier is not particularly limited, and examples thereof include a silane coupling agent, titanate-based coupling agents, phosphate-based coupling agents, carboxylate-based coupling agents, surfactants, and the like.

The amount of the surface modifier added to modify the surfaces of the electrode active material particles is preferably in a range of 0.1% by mass to 20% by mass of the electrode active material particles.

The reason for setting the amount of the surface modifier added in a range of 0.1% by mass to 20% by mass of the electrode active material particles is that, when the added amount is less than 0.1% by mass, the surfaces of the electrode active material particles cannot be sufficiently modified. On the other hand, when the added amount exceeds 20% by mass, the proportion of the surface modifier remaining after a firing step which is a post step increases, and the charge and discharge capacity per unit mass decreases.

The size of the electrode active material is not particularly limited, and the average particle diameter of the primary particles is preferably in a range of 0.01 μm to 2 μm, and more preferably in a range of 0.02 μm to 0.5 μm.

The reason for limiting the average particle diameter of the primary particles of the electrode active material in the above-described range is that, when the average particle diameter of the primary particles is less than 0.01 μm, it becomes difficult to sufficiently cover the surfaces of the primary particles with the carbonaceous film, the discharge capacity at a high-speed charge and discharge rate becomes low, and it becomes difficult to realize sufficient charge and discharge rate performance, which is not preferable. On the other hand, when the average particle diameter of the primary particles exceeds 2 μm, the internal resistance of the primary particles becomes great, and consequently, the discharge capacity at a high-speed charge and discharge rate becomes insufficient, which is not preferable.

The shape of the electrode active material is not particularly limited. Since it is easy to produce an electrode material made of spherical, particularly, truly spherical secondary particles, the shape of the primary particles made of the electrode active material is preferably spherical, particularly, truly spherical.

The reason for the shape of the electrode active material to be preferably spherical is that, when paste for cathodes is prepared by mixing the electrode active material, a binder resin (coupling agent), and a solvent together, it is possible to reduce the amount of the solvent, and it also becomes easy to apply the paste for cathodes to a collector.

In addition, when the shape of the electrode active material is spherical, the surface area of the electrode active material is minimized, it is possible to set the blending amount of a binder resin (coupling agent) added to an electrode material mixture to the minimum amount, and it is possible to decrease the internal resistance of the obtained cathode, which is preferable.

Furthermore, since it is easy to closely pack the electrode active material, the amount of a cathode material loaded per unit volume increases, thus, it is possible to increase the electrode density, and consequently, it is possible to increase the capacity of the lithium ion battery, which is preferable.

Examples of the organic compound include polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, divalent alcohols, trivalent alcohols, and the like.

Regarding the blending ratio between the electrode active material or the precursor thereof and the organic compound, when the total amount of the organic compound is converted to the amount of carbon, the content rate of carbon of the carbonaceous electrode active material complex particles is preferably in a range of 0.3% by mass to 8.0% by mass, and more preferably in a range of 0.5% by mass to 5.0% by mass.

The electrode active material or the precursor thereof and the organic compound are dissolved or dispersed in water, thereby preparing a homogeneous slurry. During the dissolution or dispersion, a dispersant may be added.

The method for dissolving or dispersing the electrode active material or the precursor thereof and the organic compound in water is not particularly limited as long as the electrode active material or the precursor thereof is dispersed, and the organic compound is dissolved and dispersed, and it is preferable to use, for example, a medium stirring-type dispersion apparatus that stirs medium particles at a high speed such as a planetary ball mill, an oscillation ball mill, a bead mill, a paint shaker, or an attritor.

During the dissolution and dispersion, it is preferable to disperse the electrode active material or the precursor thereof in a primary particle form, and then add and stir the organic compound so as to be dissolved. Then, the surfaces of the primary particles of the electrode active material or the precursor thereof are covered with the organic compound, and consequently, the organic compound-derived carbon is uniformly interposed between the primary particles of the electrode active material or the precursor thereof.

In the preparation of the slurry, when the dispersion conditions of the slurry, for example, the respective concentrations of the electrode active material or the precursor thereof and the organic compound in the slurry, the stirring time, and the like are appropriately adjusted so that the ratio (D90/D10) of the electrode active material or the precursor thereof falls in a range of 5 to 30, it is possible to obtain a volume density of the obtained agglomerate in a range of 50% by volume to 80% by volume of the volume density of the solid agglomerate, thus, it is possible to increase the concentration of the gasified substance of an aromatic carbon compound inside the agglomerate, and consequently, it becomes possible to support an almost even carbonaceous film on the surface of the electrode active material in the agglomerate.

Next, the slurry is sprayed and dried in a high-temperature atmosphere, for example, in the atmosphere at 70° C. to 250° C.

Next, the dried substance is fired in a non-oxidative atmosphere at a temperature in a range of 500° C. to 1000° C., and preferably in a range of 600° C. to 900° C. for 0.1 hours to 40 hours. The non-oxidative atmosphere is preferably an inert atmosphere of nitrogen ($N_2$), argon (Ar), or the like.

The reason for setting the firing temperature in a range of 500° C. to 1000° C. is that, when the firing temperature is lower than 500° C., the organic compound included in the dried substance is not sufficiently decomposed and reacted, and thus the organic compound is not sufficiently carbonized, and consequently, a decomposed substance of the organic compound having high resistance is generated in the obtained agglomerate, which is not preferable. On the other hand, when the firing temperature exceeds 1000° C., not only is Li in the electrode active material evaporated, creating the composition alteration of the electrode active material, but the grain growth of the electrode active material is also accelerated, and consequently, the discharge capacity at a high-speed charge and discharge rate becomes low, and it becomes difficult to realize sufficient charge and discharge rate performance, which is not preferable.

In the firing step, it is possible to control the particle size distribution of the obtained agglomerate by appropriately adjusting the firing conditions of the dried substance, for example, the rate of temperature rise rate, the maximum holding temperature, and the holding time.

Therefore, carbonaceous electrode active material complex particles which are obtained by covering with the carbonaceous material of the surfaces of the electrode active material can be obtained.

Meanwhile, in the carbonaceous electrode active material complex particles obtained above, in a case in which the oxygen content rate in the carbonaceous material is high, it is necessary to reduce the oxygen content rate to 5.0% by mass or less.

Then, the carbonaceous electrode active material complex particles are fired again (secondary firing) in a reducing atmosphere, for example, in a high-concentration hydrogen atmosphere at a temperature in a range of 500° C. to 1000° C. and preferably in a range of 600° C. to 900° C. for 0.1 hours to 40 hours. Therefore, it is possible to reduce the oxygen content rate in the carbonaceous material to 5.0% by mass or less.

The reason for setting the firing temperature of the secondary firing in a range of 500° C. to 1000° C. is that, when the firing temperature is lower than 500° C., oxygen in the carbonaceous material is not sufficiently detached, which is not preferable. On the other hand, when the firing temperature exceeds 1000° C., not only is Li in the electrode active material evaporated, creating the alteration of the composition of the electrode active material, but the grain growth of the electrode active material is also accelerated, and consequently, the discharge capacity at a high-speed charge and discharge rate becomes low, and it becomes difficult to realize sufficient charge and discharge rate performance, which is not preferable.

Through the above-described steps, the surfaces of the primary particles of the electrode active material are coated with a carbonaceous material generated by the thermal decomposition of the organic compound in the dried substance, and thus an agglomerate made of secondary particles in which the carbonaceous material is interposed between the primary particles of the electrode active material is obtained.

The agglomerate serves as the electrode material in the present embodiment.

Electrode

An electrode of the present embodiment is an electrode containing the electrode material of the present embodiment.

To produce the electrode of the present embodiment, the electrode material, a coupling agent made of a binder resin, and a solvent are mixed together, thereby preparing paint for electrode formation or paste for electrode formation. At this time, a conductive auxiliary agent such as carbon black may be added if necessary.

As the coupling agent, that is, the binder resin, for example, a polytetrafluoroethylene (PTFE) resin, a polyvinylidene fluoride (PVdF) resin, fluorine rubber, or the like is preferably used.

The blending ratio of the binder resin to the electrode material is not particularly limited, and, for example, the amount of the binder resin blended is set in a range of 1 part by mass to 30 parts by mass, and is preferably in a range of 3 parts by mass to 20 parts by mass with respect to 100 parts by mass of the electrode material.

The solvent used for the paint for electrode formation or the paste for electrode formation may be appropriately selected in accordance with the properties of the binder resin, and examples thereof include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diehtylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetamide, and N-methyl pyrrolidone, glycols such as ethylene glycol, diethylene glycol, and propylene glycol, and the like. The solvent may be singly used, or a mixture of two or more solvents may be used.

Next, the paint for electrode formation or the paste for electrode formation is applied to one surface of a metal foil, and then is dried, thereby obtaining a metal foil having a coated film made of a mixture of the electrode material and the binder resin formed on one surface.

Next, the coated film is bonded by pressing, and is dried, thereby producing a collector (electrode) having an electrode material layer on one surface of the metal foil.

Through the above-described steps, the electrode of the present embodiment having a reduced oxygen content rate can be produced.

Lithium Ion Battery

A lithium ion battery of the present embodiment includes a cathode made of the electrode of the present embodiment.

Since the electrode is produced using the electrode material of the present embodiment, the lithium ion battery is capable of suppressing not only the amount of gas generated in the battery during charge and discharge but also the deterioration of battery components without reducing the charge and discharge capacity. Therefore, it is possible to provide an electrode having excellent charge and discharge characteristics and long-term reliability.

In the lithium ion battery of the present embodiment, there is no particular limitation regarding the anode, an electrolytic solution, a separator, and the like. For example, for the anode, it is possible to use an anode material such as Li metal, a carbon material, a Li alloy, or $Li_4Ti_5O_{12}$. In addition, a solid electrolyte may be used in place of the electrolytic solution and the separator.

As described above, according to the electrode material of the present embodiment, since the oxygen content rate in the carbonaceous material on the carbonaceous electrode active material complex particles is set to 3.0% by mass or less, and the specific surface area of the carbonaceous electrode active material complex particles is set in a range of 1 $m^2/g$ to 80 $m^2/g$, it is possible to suppress not only the amount of gas generated in the battery during charge and discharge but also the deterioration of battery components without reducing the charge and discharge capacity.

Therefore, it is possible to provide an electrode material having excellent charge and discharge characteristics and long-term reliability.

According to the electrode of the present embodiment, since the electrode material of the present embodiment is included, it is possible to suppress not only the amount of gas generated in the battery during charge and discharge but also the deterioration of battery components without reducing the charge and discharge capacity. Therefore, it is possible to provide an electrode having excellent charge and discharge characteristics and long-term reliability.

According to the lithium ion battery of the present embodiment, since the cathode made of the electrode of the present embodiment is included, it is possible to suppress not only the amount of gas generated in the battery during charge and discharge but also the deterioration of battery components without reducing the charge and discharge capacity. Therefore, it is possible to provide a lithium ion battery having excellent charge and discharge characteristics and long-term reliability.

EXAMPLES

Hereinafter, the present invention will be specifically described using Examples 1 to 4 and Comparative Examples 1 to 3, but the present invention is not limited to these examples.

Example 1

Production of an Electrode Material 4 mol of lithium acetate ($LiCH_3COO$), 2 mol of iron (II) sulfate ($FeSO_4$), and 2 mol of phosphoric acid ($H_3PO_4$) were mixed with 2 L (liters) of water so that the total amount reached 4 L, thereby preparing a homogeneous slurry-form mixture.

Next, the mixture was accommodated in a pressure-resistant airtight container having a capacity of 8 L, and was performed a hydrothermal synthesis for 1 hour at 200° C.

Next, the obtained sediment was washed using water, thereby obtaining a cake-form precursor of an electrode active material.

Next, 3% by mass of 3-aminopropyltrimethoxysilane was added as a surface modifier to the obtained cake-form precursor of the electrode active material, then, was heated and stirred at 80° C. for 5 hours, and the surface of the precursor of the electrode active material was modified.

Next, 150 g of the precursor of the electrode active material having the modified surface (in terms of the solid content) and a polyvinyl alcohol aqueous solution obtained by dissolving 7.0 g of polyvinyl alcohol (PVA) as an organic compound in 100 g of water were mixed so as to produce a slurry, and a dispersion treatment was carried out on the slurry using a binary fluid-type wet jet crusher so that D50 reached 38 nm in the particle size distribution of the precursor of the electrode active material in the slurry.

Next, the slurry on which the dispersion treatment had been carried out was sprayed and dried in the atmosphere at 180° C., the obtained dried substance was fired at 700° C. in a nitrogen atmosphere for 1 hour, and the obtained fired substance was secondarily fired at 700° C. in a hydrogen atmosphere for 1 hour, thereby obtaining an electrode material of Example 1.

Assessment of the Electrode Material

The amount of oxygen in the carbonaceous material of the electrode material, the amount of adsorbed moisture in the carbonaceous electrode active material complex particles, the amount of carbon, and the coating ratio of the carbonaceous material were assessed. The assessment methods are as described below.

(1) The Amount of Oxygen in the Carbonaceous Material

Since the electrode active material contains a large amount of oxygen, in order to assess the amount of oxygen in the carbonaceous material of the carbonaceous electrode active material complex particles, the electrode active material in the carbonaceous electrode active material complex particles was dissolved using a hydrochloric solution, thereby obtaining a simple substance of carbonaceous. After that, the simple substance of carbonaceous was washed using pure water, and was vacuum-dried at 100° C. for 2 hours. For the obtained dried substance, the amount of oxygen was measured using an oxygen and nitrogen analyzer.

(2) The Amount of Adsorbed Moisture

The amount of adsorbed moisture in the carbonaceous electrode active material complex particles was measured using a Karl Fischer volumetric titrator.

(3) The Amount of Carbon

The amount of carbon in the carbonaceous electrode active material complex particles was measured using a carbon and sulfur analyzer.

(4) The Coating Ratio of the Carbonaceous Material

The coating ratio of the carbonaceous material on the surfaces of the carbonaceous electrode active material complex particles was measured using a transmission electron microscope (TEM).

The assessment results are described in Table 1.

Production of a Lithium Ion Battery

The electrode material, polyvinylidene fluoride (PVdF) as a binder, and acetylene black (AB) as a conductive auxiliary agent were mixed so that the mass ratio reached 90:5:5, and furthermore, N-methyl-2-pyrrolidone (NMP) was added as a solvent so as to impart fluidity, thereby producing a slurry.

Next, the slurry was applied onto a 15 μm-thick aluminum (Al) foil, and was dried. After that, the slurry was pressurized at a pressure of 600 kgf/cm$^2$, thereby producing a cathode of a lithium ion battery of Example 1.

Lithium metal was disposed as an anode to the cathode of the lithium ion battery, and a separator made of porous polypropylene was disposed between the cathode and the anode, thereby producing a battery member.

Meanwhile, ethylene carbonate and diethyl carbonate were mixed together in (a mass ratio of) 1:1, and furthermore 1 M of a LiPF$_6$ solution was added thereto, thereby producing an electrolyte solution having lithium ion conductivity.

Next, the battery member was immersed in the electrolyte solution, thereby producing the lithium ion battery of Example 1.

Assessment of the Lithium Ion Battery

The amount of gas generated and the charge and discharge capacity during the charge and discharge of the lithium ion battery were assessed. The assessment methods are as described below.

(1) The Amount of Gas Generated

The cathode having an electrode area of 20 cm$^2$ and an electrode density of 2.0 g/mL and the anode made of lithium metal were placed opposite to each other through the 25 μm-thick separator made of polypropylene, and those were disposed in a laminate film container. And then, the upper limit of the charge potential at 1 C was set to 4.3 V vs Li/Li+ and 4.5 V vs Li/Li+, the lower limit potential during discharge was set to 4.3 V vs Li/Li+, and the amount of gas generated after 10 cycles of charge and discharge was assessed.

The volume of a pouch cell after the charge and discharge was measured using the Archimedes method, and the amount of increased volume was used as the amount of gas generated.

(2) The Charge and Discharge Capacity

The cathode having an electrode area of 20 cm$^2$ and an electrode density of 2.0 g/mL and the anode made of lithium metal were placed opposite to each other through the 25 μm-thick separator made of polypropylene, and those were disposed in a coin cell container having a diameter of 2 cm and a thickness of 3.2 mm. And then, the charge and discharge capacities at 1 C and 3 C were measured.

The assessment results are described in Table 1.

Example 2

An electrode material and a lithium ion battery of Example 2 were produced in the same manner as in Example 1 except for the fact that 1% by mass of 3-aminopropyltrimethoxysilane was added as the surface modifier to the cake-form precursor of the electrode active material, and were assessed. The assessment results are described in Table 1.

Example 3

An electrode material and a lithium ion battery of Example 3 were produced in the same manner as in Example 1 except for the fact that the firing temperature during the secondary firing was set to 600° C., and were assessed. The assessment results are described in Table 1.

Example 4

An electrode material and a lithium ion battery of Example 4 were produced in the same manner as in Example 1 except for the facts that 1% by mass of 3-aminopropyltrimethoxysilane was added as the surface modifier to the cake-form precursor of the electrode active material and the firing temperature during the secondary firing was set to 600° C., and were assessed. The assessment results are described in Table 1.

Comparative Example 1

An electrode material and a lithium ion battery of Comparative Example 1 were produced in the same manner as in Example 1 except for the facts that the surface of the precursor of the electrode active material was not modified, and the secondary firing was not carried out, and were assessed. The assessment results are described in Table 1.

Comparative Example 2

An electrode material and a lithium ion battery of Comparative Example 2 were produced in the same manner as in Example 1 except for the fact that the firing temperature during the secondary firing was set to 1050° C., and were assessed. The assessment results are described in Table 1.

Comparative Example 3

An electrode material and a lithium ion battery of Comparative Example 3 were produced in the same manner as in Example 1 except for the fact that the firing temperature during the secondary firing was set to 450° C., and were assessed. The assessment results are described in Table 1.

TABLE 1

|  | Amount of oxygen in carbonaceous material (% by mass) | Amount of adsorbed moisture (% by mass) | Amount of carbon (% by mass) | Coating ratio of carbonaceous material (%) | Amount of gas generated (cm$^3$/g) | | Charge and discharge capacity (mAh/g) | |
|---|---|---|---|---|---|---|---|---|
|  |  |  |  |  | 4.3 V | 4.5 V | After one cycle | After ten cycles |
| Example 1 | 1.1 | 2 | 4 | 92 | 0.1 | 0.4 | 160 | 155 |
| Example 2 | 1.0 | 2 | 3 | 80 | 0.1 | 0.2 | 160 | 154 |
| Example 3 | 4.2 | 2 | 5 | 94 | 0.1 | 0.3 | 160 | 155 |
| Example 4 | 3.1 | 2 | 4 | 81 | 0.1 | 0.3 | 158 | 153 |
| Comparative Example 1 | 6.0 | 6 | 5 | 58 | 10.8 | 15.1 | 150 | 106 |

TABLE 1-continued

| | Amount of oxygen in carbonaceous material (% by mass) | Amount of adsorbed moisture (% by mass) | Amount of carbon (% by mass) | Coating ratio of carbonaceous material (%) | Amount of gas generated (cm³/g) 4.3 V | Amount of gas generated (cm³/g) 4.5 V | Charge and discharge capacity (mAh/g) After one cycle | Charge and discharge capacity (mAh/g) After ten cycles |
|---|---|---|---|---|---|---|---|---|
| Comparative Example 2 | 4.3 | 7 | 1 | 57 | 6.6 | 8.9 | 120 | 74 |
| Comparative Example 3 | 6.5 | 8 | 5 | 81 | 3.2 | 6.1 | 159 | 100 |

According to the above-described results, it was confirmed that, in the electrode materials of Examples 1 to 4, the oxygen content rate in the carbonaceous material was 5.0% by mass or less, the coating ratio of the carbonaceous material was 81% or more, the specific surface area was in a range of 1 m²/g to 80 m²/g, the amounts of gas generated during the charge and discharge were 0.2 cm³/g or less at 4.3 V and 0.4 cm³/g or less at 4.5 V, the charge and discharge capacities were 158 mAh/g or more after 1 cycle and 153 mAh/g or more after 10 cycles, and the amount of gas generated during the charge and discharge was reduced without reducing the charge and discharge capacity.

On the other hand, in the electrode materials of Comparative Examples 1 to 3, any one of the oxygen content rate in the carbonaceous material, the specific surface area, the amount of gas generated during the charge and discharge, and the charge and discharge capacity were poorer than those of the electrode materials of Examples 1 to 4, and consequently, either or both the charge and discharge capacity and the amount of gas generated during the charge and discharge were poorer than those of the electrode materials of Examples 1 to 4.

When the oxygen content rate in the carbonaceous material on the surfaces of the electrode active material particles that are a main component of the carbonaceous electrode active material complex particles is set to 5.0% by mass or less, and the coating ratio of the carbonaceous material on the surfaces of the carbonaceous electrode active material complex particles is set to 60% or more, the electrode material of the present invention is capable of suppressing not only the amount of gas generated in the battery during charge and discharge but also the deterioration of battery components without reducing the charge and discharge capacity, and thus it is possible to provide an electrode material having excellent charge and discharge characteristics and long-term reliability. Therefore, the electrode material is applicable to next-generation secondary batteries anticipated to have smaller size, lighter weight, and higher capacity, and in the case of next-generation secondary batteries, the effects are extremely great.

What is claimed is:

1. An electrode material comprising carbonaceous electrode active material complex particles including a carbonaceous material film on surfaces of electrode active material particles, wherein
   the water content of the carbonaceous electrode active material complex particles is 5% by mass or less,
   the oxygen content of the carbonaceous material film is 4.2% by mass or less,
   a coating ratio of the carbonaceous material film on the surfaces of the carbonaceous electrode active material complex particles is 60% or more,
   the content of carbon in the carbonaceous electrode active material complex particles is in a range of 0.3% by mass to 8.0% by mass,
   the electrode active material particles include one or more selected from the group consisting of lithium cobaltate, lithium nickelate, lithium manganate, lithium titanate, and $Li_xA_yD_zPO_4$ as a main component, wherein A represents one or more selected from the group consisting of Co, Mn, Ni, Fe, Cu, and Cr; D represents one or more selected from the group consisting of Mg, Ca, S, Sr, Ba, Ti, Zn, B, Al, Ga, In, Si, Ge, Sc, Y, and rare earth elements; $0<x<2$; $0<y<1.5$; and $0 \leq z<1.5$, and
   the amount of oxygen in the carbonaceous material film is determined such that the electrode active material in the carbonaceous electrode active material complex particles is dissolved using a hydrochloric solution to obtain a carbonaceous substance, and the carbonaceous substance is washed using pure water and is vacuum-dried, and the amount of oxygen of the obtained dried substance is measured using an oxygen and nitrogen analyzer.

2. An electrode comprising the electrode material according to claim 1.

3. A lithium ion battery comprising a cathode made of the electrode according to claim 2.

4. The electrode material according to claim 1, wherein the coating ratio of the carbonaceous material film on the surfaces of the carbonaceous electrode active material complex particles is 80% or more.

5. The electrode material according to claim 1, wherein the water content of the carbonaceous electrode active material complex particles is 2.5% by mass or less.

6. The electrode material according to claim 1, wherein an average particle diameter of primary particles of the electrode active material particles is in a range of 0.01 μm to 2 μm.

7. The electrode material according to claim 1, wherein a specific surface area of the carbonaceous electrode active material complex particles is in a range of 1 m²/g to 80 m²/g.

8. The electrode material according to claim 1, wherein the content of carbon in the carbonaceous electrode active material complex particles is in a range of 0.5% by mass to 5.0% by mass.

9. The electrode material according to claim 1, wherein a shape of the electrode active material is spherical.

10. The electrode material according to claim 1, wherein the electrode material is obtained by a process comprising the steps of:
   preparing electrode active material or precursor of the active material, an organic compound and water,
   mixing the electrode active material or the precursor, the organic compound and the water to form a slurry wherein a ratio of the particle diameter D90 of the electrode active material or the precursor to the particle diameter D10 of the electrode active material or the precursor is in a range of 5 to 30, drying the slurry by spraying the slurry in the atmosphere of 70° C. to 250° C., firing the dried slurry at 500° C. to 1000° C. in a non-oxidative atmosphere for 0.1 hours to 40 hours, and firing the fired slurry at 500° C. to 1000° C. in a reducing atmosphere for 0.1 hours to 40 hours.

11. The electrode material according to claim 10, wherein the organic compound is at least one selected from the group consisting of polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, divalent alcohols and trivalent alcohols.

12. The electrode material according to claim 10, wherein the non-oxidative atmosphere is nitrogen or argon atmosphere.

13. The electrode material according to claim 10, wherein the reducing atmosphere is a hydrogen atmosphere.

14. The electrode material according to claim 10, wherein the shape of the electrode active material is spherical.

* * * * *